UNITED STATES PATENT OFFICE.

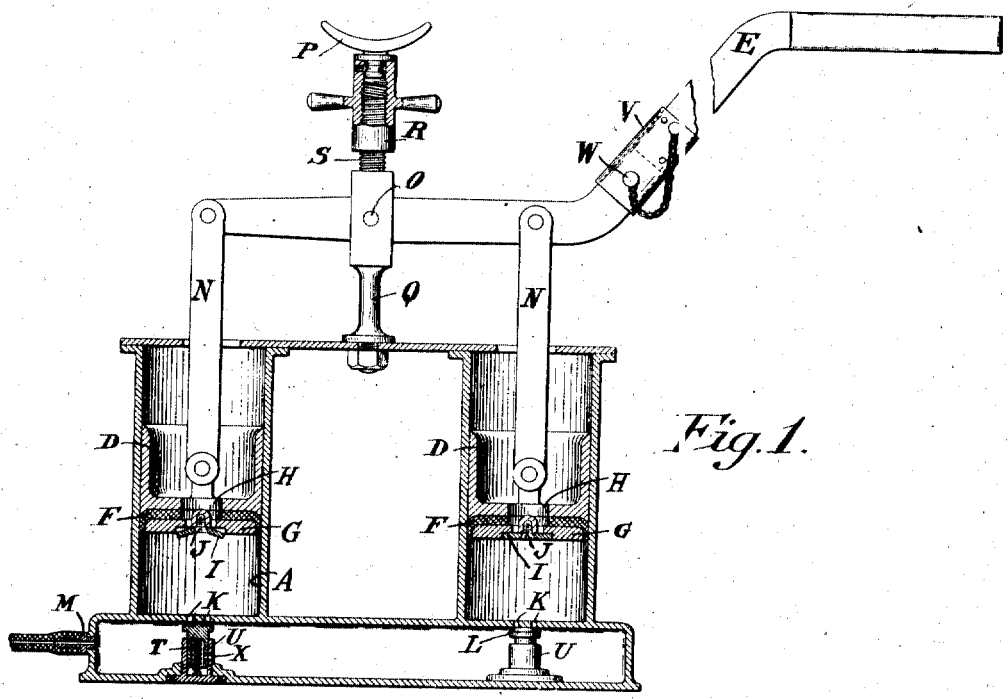
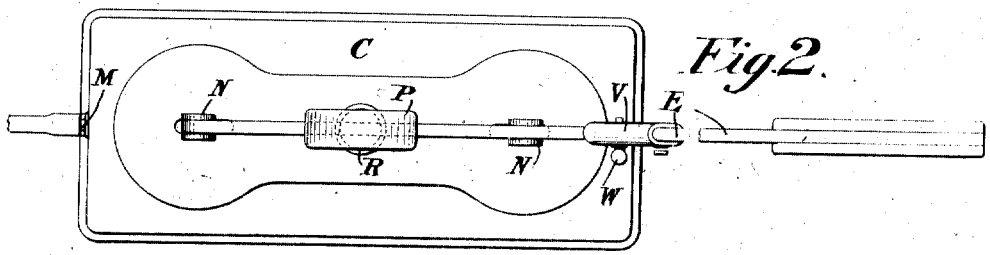
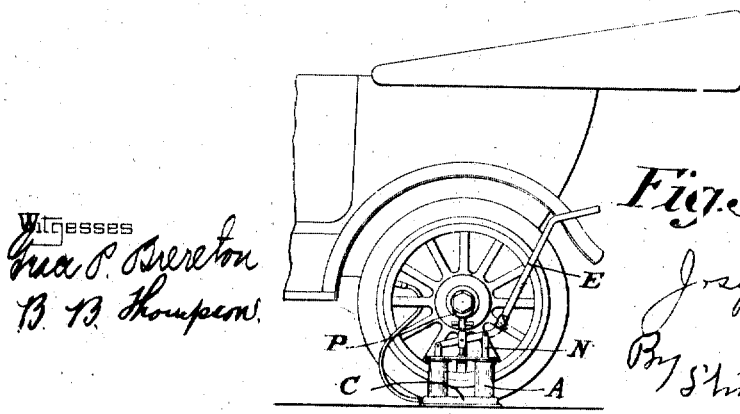

JOSEPH HEELEY, OF WIGAN, ENGLAND.

TIRE-INFLATING PUMP.

1,216,688.  Specification of Letters Patent.  Patented Feb. 20, 1917.

Application filed April 13, 1915. Serial No. 21,014.

*To all whom it may concern:*

Be it known that I, JOSEPH HEELEY, a subject of the King of Great Britain, residing at Wigan, in the county of Lancaster, in the Kingdom of England, have invented certain new and useful Improvements in Tire-Inflating Pumps, of which the following is a specification.

In tire inflating pumps as hitherto made the action is pulsative, and the air is delivered into the tire in jerks. The object of the present invention is to provide a portable hand operated tire-inflating pump so arranged that the delivery of air into the tire shall be substantially continuous.

It comprises a pair of compression cylinders mounted on a casing which serves the double purpose of an air receiver and a base plate, and working pistons in each cylinder coupled by connecting rods to a pivoted hand lever at diametrically opposite sides of the pivot, with the object of making the pistons effective alternately each upon their downstroke, to charge the air receiver with compressed air and enable such compressed air to be delivered in a continuous stream from the receiver into the tire, thus expediting the inflation of tires.

In the accompanying drawing—

Figure 1 is a sectional elevation of my two cylinder compressor,

Fig. 2 a plan view, and

Fig. 3 is a view showing the application of the pump to a motor car.

A are the two vertical air pump cylinders cast in a piece with an air receiver C at the bottom, which latter acts as a base plate or bed plate, and forms the bottom of each cylinder. Each cylinder A which is open at top, has a piston D worked from a single lever or handle E, and the said pistons D are effective alternately each upon its down stroke. At the flat bottom of each piston D is fitted a suitable cup leather F or the like working against the bore of the cylinder A, for preventing leakage of air between the piston and the cylinder in which it works. This leather F is clamped to the bottom of its piston by a plate or disk G, with the leather interposed between. Each piston D has an aperture H through it, covered by a flexible valve I, the said plate or disk G being recessed so as to receive the said valve and enable it to lie flush with the bottom thereof when closed, the valve I being secured by a pin J screwed into the grid on which the valve is seated. This valve opens during the ascent of the pistons D, but instantly assumes its place upon its seat during the compression stroke. The top side of the receiver C directly under each piston, has delivery apertures K for the air compressed by the pump, and each set of apertures is controlled from below by a valve L held normally against its seat by a spring T, so as not to form any obstruction to the pistons coming flat against the bottom of the respective cylinders A, and obviating any space or clearance between. The valve L which is located inside the air receiver is by means of its stem guided in a carrier U. This carrier which is in the form of a socket with a flange at the lower end, is screwed into a hole in the under side of the receiver C so as to project up into the inside thereof, while the flange fits a recess in the underside of the base of the receiver. The spring T is spigoted into a recess in the valve stem, and holes X are provided in the carrier and valve stem to enable compressed air to enter the recess, and so assist in holding the valve L against its seat. At the side of the air receiver C is a nozzle member or exit aperture M to which an ordinary flexible pipe is attached for connection with the inflating valve of the tire. Each piston is coupled by a connecting rod N to the hand lever E, one on each side of the pivot O on which the handle oscillates, this pivot being mounted in a standard Q between the cylinders. Y is a plate bolted to the top of the cylinders for supporting the standard Q. By operating the hand lever E, the pistons D are alternately caused to rise and descend, and air is alternately compressed in one cylinder and discharged through the outlet valve into the receiver C, and so out through the exit orifice into the tire, while the ascent of the other piston admits air into the cylinder ready for compression. The whole of the air is forced out of the cylinders into the reservoir at each down stroke of the pistons. This effects a saving in power, because the air is not allowed to expand and follow the piston back on the return stroke which does take place in the case of known tire-inflating pumps. In the well known single cylinder tire-inflating pumps, the action is pulsative and the whole of the air is forced in jerks through the valve in the tire at the last portion of the down-stroke of the piston, but by the present invention the air is charged into the receiver almost continuously, and consequently a constant flow of air is delivered therefrom into the tire. During the very short period when one or other of the pistons is not compressing, the air expands in the receiver C, and the delivery of the air through the aperture M still goes on. The handle E is made in two parts, and the two parts coupled together by a socket member V one end of which is riveted to one part of the handle, while the other end is locked to the other part of the handle by a removable pin W. One part of the handle is therefore detachable from the other part, which makes the apparatus more convenient for carrying.

The standard Q in which the hand lever is pivoted is or can be fitted with a lifting jack P in which the power consists of a nut R rotatable on a screw S. By this means the apparatus can be placed between any convenient part of the vehicle and the ground, such as under the springs or wheel cap, and thus by operating the nut R the apparatus is clamped rigid by the weight of the vehicle resting on it, and enabling the operator to work the hand lever quite easily.

I declare that what I claim is:—

In a portable tire inflating pump, the combination with two compression cylinders open at the top, a casing which serves the double purpose of an air receiver and base plate upon which the said cylinders are mounted, and a working piston in each cylinder, of a standard supported between the cylinders at the top, a hand rocking lever pivoted to the top of the standard, connecting rods coupling the rocking lever to the pistons at diametrically opposite sides to the pivot, and a lifting jack fitted to the top of the standard substantially as described.

In witness whereof, I have hereunto signed my name this 24th day of March 1915, in the presence of two subscribing witnesses.

JOSEPH HEELEY.

Witnesses:
 Thomas Wood,
 G. C. Dymond.